United States Patent [19]
Rekow et al.

[11] Patent Number: 6,031,953
[45] Date of Patent: Feb. 29, 2000

[54] DIODE-LASER TO OPTICAL FIBER COUPLING SYSTEM WITH BIAXIAL OPTICAL POWER

[75] Inventors: Matthew Noel Rekow, Santa Cruz; John Lawrence Nightingale, Portola Valley, both of Calif.

[73] Assignee: Coherent, Inc., Santa Clara, Calif.

[21] Appl. No.: 09/072,768

[22] Filed: May 4, 1998

Related U.S. Application Data

[60] Provisional application No. 60/080,187, Mar. 24, 1998.

[51] Int. Cl.$^7$ ...................................................... G02B 6/30
[52] U.S. Cl. .................................. 385/49; 385/39; 385/88
[58] Field of Search ................................. 385/39, 49, 88, 385/93, 92

[56] References Cited

U.S. PATENT DOCUMENTS

| | | | |
|---|---|---|---|
| 4,130,343 | 12/1978 | Miller et al. | 350/96.15 |
| 5,121,457 | 6/1992 | Foley et al. | 385/89 |
| 5,268,978 | 12/1993 | Po et al. | 385/33 |
| 5,390,271 | 2/1995 | Priest | 385/92 |
| 5,436,990 | 7/1995 | Head et al. | 385/34 |

OTHER PUBLICATIONS

Lee, Kyung S. & Barnes, Frank S., "Simple Side Coupler For Coupling Between Laser Diode And Single-Mode Optical Fiber", Reprint 29 from Appl. Opt., vol. 26, No. 12, Jun. 15, 1987, pp. 211–213.

Foley, B.M. et al, "Technique For Alignment of Semiconductor Lasers To Bevelled Single-Mode Fibres", Electronics Letters, Dec. 6, 1990, vol. 26, No. 25, pp. 2118–2120.

*Primary Examiner*—Rodney Bovernick
*Assistant Examiner*—Ellen E. Kim
*Attorney, Agent, or Firm*—Limbach & Limbach L.L.P.

[57] ABSTRACT

A coupling system for enhanced light coupling between a laser diode and an optical fiber that includes a laser diode having an emitting surface for generating an asymmetric beam with a fast axis that is more divergent than an orthogonal slow axis thereof, an optical fiber having an input end and a delivery end, a first microlens mounted on the input side surface of the fiber, and a second microlens disposed between the laser diode and the first microlens. The input end of the optical fiber includes a beveled end surface disposed at an oblique angle with respect to a longitudinal axis of the optical fiber, and a light input side surface opposing the beveled end surface and aligned with the emitting surface of the laser diode to capture the beam emitted therefrom. The angle of the beveled surface is selected such that the beam entering the input side surface from the laser diode is total internally reflected by the beveled surface along the longitudinal axis of the fiber. The first microlens is mounted on the input side surface of the fiber in a manner to have optical continuity therewith for focusing light into the fiber and having a focal power along an axis perpendicular to the longitudinal axis of the fiber. The second microlens has a focal power along the fast axis of the beam.

19 Claims, 4 Drawing Sheets

DIODE-LASER TO OPTICAL FIBER COUPLING SYSTEM WITH BIAXIAL OPTICAL POWER

This application claims priority from provisional application Ser. No. 60/030,187 filed Mar. 24, 1998.

FIELD OF THE INVENTION

The present invention relates generally to coupling radiation from a diode-laser into an optical fiber. The invention relates in particular to coupling the laser radiation transversely into the optical fiber using total internal reflection from a forty-five degree polished surface on the end of the fiber.

BACKGROUND OF THE INVENTION

The output beam of an edge-emitting diode-laser is typically delivered from an emitting area (output-face) thereof which is much wider than it is high. The output beam is highly asymmetric, diverging much less in the width direction of the output-face than in the height direction of the output-face. The width and height directions are commonly referred to by practitioners of the art as the slow and fast axes respectively of the diode-laser.

In many so-called diode-laser packages or modules, the asymmetric output beam of one or more diode-lasers is coupled into one or more optical fibers. Transmission of the beam along an optical fiber, even for a relatively short length, "homogenizes" the beam, such that when it is delivered from the end of the fiber the beam has a relatively symmetrical distribution. The output of the optical fiber (or in the case of multiple diodes-per-module a fiber array or bundle) provides the output aperture of the module. For efficient coupling, it is required that the beam lateral dimension and beam divergence in both the fast and slow axes be equal to or less than the fiber diameter and numerical aperture where the beam is launched into the fiber.

In many arrangements, a diode-laser beam is coupled longitudinally into the end of a fiber. In so-called "butt coupling" arrangements, the fiber end-face is simply placed as close to the emitting-area of the diode-laser as possible, and the fiber is sized to collect as much of the beam as possible. This arrangement is not particularly efficient.

In a more efficient longitudinal-coupling arrangement, a cylindrical microlens, which may itself be a short length of optical fiber, is aligned close to the diode-laser emitting-area parallel to the width direction thereof. The end of the optical fiber into which the radiation is to be coupled is placed close to the microlens. The microlens has optical power only in the fast axis of the diode-laser and is arranged to collect as much as possible of the output beam in that axis and collimate or focus the output beam into the optical fiber. As the microlens has no optical power in the slow axis of the diode laser, the optical fiber must be sized, and have a numerical aperture sufficient, to collect as much as possible of the beam in the slow axis. This coupling method is commonly used for coupling output beams from a longitudinal array of diode-lasers (a so-called diode-laser bar) into an array of optical fibers. A single length of optical fiber can serve as the cylindrical microlens lens for all diode-lasers in the array.

A problem with the single microlens is that it can be difficult to get all of the desired focusing power into a single microlens. The lens can be too small to be conveniently handled, and may need to be positioned too close to the laser diode for convenience. Another problem with a single microlens is that the beam divergence and beam lateral dimensions, even in the axis with optical power, cannot be independently controlled. Furthermore, there is no focusing in the axis perpendicular to the lens which, for efficient coupling, constrains the dimensions of the optical fiber to equal or exceed that of the laser diode slow-axis emission width.

In general it is desirable to have optical power in both the fast-axis and slow-axis for most efficient coupling. Such systems have been demonstrated using a crossed pair of cylindrical lenses or a single microoptic fabricated with a different surface figure in each axis. In the prior art, for both these systems, the lens or lenses are positioned in a linear fashion between the laser diode and optical fiber.

Both of these systems have drawbacks. While the combination of crossed cylindrical lenses is efficient because it has optical power in both axes, it is very difficult to align. Moveover, light from the laser diode must pass through five optical surfaces before it is launched inside the fiber. For efficient coupling these surfaces would need to be anti-reflection coated, thus increasing the system cost. Regarding the single microoptic with different optical powers in orthogonal axes, it is not readily manufacturable with standard optical fabrication techniques. As a result, such an optical element is expensive relative to cylindrical lenses fabricated from drawing glass preforms. The single microlens also does not allow independent adjustment of beam lateral dimension and beam divergence.

An alternate coupling arrangement, used typically for coupling the output beam of a single diode-laser into an optical fiber, is a transverse coupling method. In this arrangement, the end of a fiber into which the output-beam is to be coupled is polished at an angle of about forty-five degrees to the longitudinal axis of the fiber. The fiber is oriented with its longitudinal axis perpendicular to the fast axis of the diode-laser, and close to the end-face of the diode-laser, such that the output-beam passes transversely through the fiber and is reflected internally from the angle-polished surface thereof along the fiber. This arrangement allows the cylindrical outer surface of the fiber itself to act as its own lens for focusing the fast-axis radiation of the output beam.

While this system is appealing in its simplicity it suffers from low collection efficiency. The refractive index and surface figure of a typical optical fiber is not optimal for focusing the fast-axis radiation. In the slow-axis no optical power is available to focus the beam, which constrains the fiber dimensions for efficient coupling. Further, it is impractical to coat the optical fiber with an anti-reflection coating because it is difficult to coat just the side surface of the fiber at its input end.

There is a need for a coupling arrangement which provides optical power in both axes of the diode-laser. Furthermore, there is a need to match the lateral beam dimensions in the fast-axis and slow-axis at the point where the beam in launched into the optical fiber. The coupling arrangement needs to provide these attributes with a minimum number of inexpensively fabricated optical components which have a minimum number of transmissive optical surfaces. These components need to be convenient to align, and have reasonable mechanical tolerances for optimum coupling efficiency.

SUMMARY OF THE INVENTION

The present invention solves the above mentioned problems by providing an efficient coupling system for enhanced light coupling between a laser diode and an optical fiber.

In one aspect of the present invention, the coupling system includes a laser diode with an emitting surface for generating an asymmetric beam, an optical fiber and a first microlens. The optical fiber has an input end and a delivery end. The delivery end includes a beveled end surface disposed at an oblique angle with respect to a longitudinal axis of the optical fiber, and a light input side surface opposing the beveled end surface and aligned with the emitting surface of the laser diode to capture the beam emitted therefrom. The angle of the beveled surface is selected such that the beam entering the input side surface from the laser diode is reflected by the beveled surface along the longitudinal axis of the fiber. The first microlens is mounted on the input side surface of the fiber in a manner to have optical continuity therewith for focusing light into the fiber.

In another aspect of the present invention, the coupling system includes a laser diode having an emitting surface for generating an asymmetric beam with a fast axis that is more divergent than an orthogonal slow axis thereof, an optical fiber having an input end and a delivery end, a first microlens mounted on the input side surface of the fiber, and a second microlens disposed between the laser diode and the first microlens. The input end of the optical fiber includes a beveled end surface disposed at an oblique angle with respect to a longitudinal axis of the optical fiber, and a light input side surface opposing the beveled end surface and aligned with the emitting surface of the laser diode to capture the beam emitted therefrom. The angle of the beveled surface is selected such that the beam entering the input side surface from the laser diode is total internally reflected by the beveled surface along the longitudinal axis of the fiber. The first microlens is mounted on the input side surface of the fiber in a manner to have optical continuity therewith for focusing light into the fiber and having a focal power along an axis perpendicular to the longitudinal axis of the fiber. The second microlens has a focal power along the fast axis of the beam.

In yet another aspect of the present invention, a system for enhancing the coupling of light between a laser diode and an optical fiber includes a laser diode having an emitting surface, an optical fiber having an input end and a delivery end, and a microlens. The input end of the optical fiber includes a beveled surface that is disposed at a non-normal angle with respect to the longitudinal axis of the optical fiber and is opposed to a light input surface of the fiber. The angle of the beveled surface is selected such that light entering the input surface of the fiber will be totally internally reflected into the fiber. The input surface of the fiber is aligned with the emitting surface of the laser diode, and the microlens is mounted on the input surface of the fiber for focusing light into the fiber.

In still yet another aspect of the present invention, a system for enhancing the coupling of light between a laser diode and an optical fiber includes a laser diode having an emitting surface and generating an asymmetric beam having a fast axis and a slow axis, an optical fiber having an input end and a delivery end, a first microlens and a second microlens. The input end of the optical fiber includes a beveled surface that is disposed at a non-normal angle with respect to the longitudinal axis of the optical fiber and is opposed to a light input surface of the fiber. The angle of the beveled surface is selected such that light entering the input surface of the fiber will be totally internally reflected into the fiber. The longitudinal axis of the input surface of the fiber is aligned with the fast axis of the emitting surface of the laser diode. The first microlens is mounted on the input surface of the fiber for focusing light into the fiber and has a focal power along the slow axis of the emitting surface of the laser diode. The second microlens is located between the laser diode and the fiber for focusing light into the fiber. The second microlens has a focal power in the fast axis of the emitting surface of the laser diode.

DETAILED DESCRIPTION OF THE PREFERRED EMBODIMENTS

Figure 1:
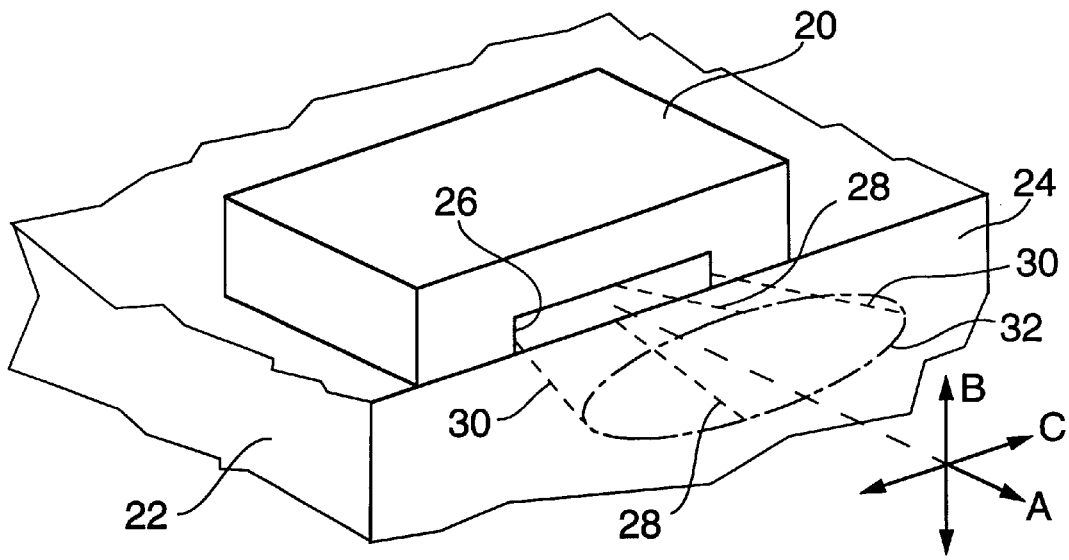
FIG. 1 is a perspective view schematically illustrating output beam characteristics of an edge-emitting diode-laser.

Turning now to the drawings, wherein like components are designated by like reference numerals, FIG. 1 schematically illustrates an edge-emitting diode-laser 20 mounted on a submount 22 and emitting a diverging laser beam 24. Laser-light is emitted from an emitting-area or output-face 26 generally along a propagation axis indicated by arrow A which is perpendicular to the output-face. An emitting-area is usually a stripe three to one-hundred or more micrometers wide by about 1 micrometer high. The narrow stripe widths emit a single transverse mode beam, while the wider stripe widths emit a multi-transverse mode laser beam. The term laser-light as used herein is meant to encompass electromagnetic radiation at ultraviolet and infrared wavelengths as well as visible wavelengths. Divergent beam 24 is exemplified by rays 28 and 30. The beam diverges more strongly (rays 28) in fast axis B (the height direction of emitting-area 26) than in the width direction or slow axis C (rays 30). The beam has an elongated, somewhat-elliptical cross-section 32 in the vicinity of the emitting-area.

Figure 2:
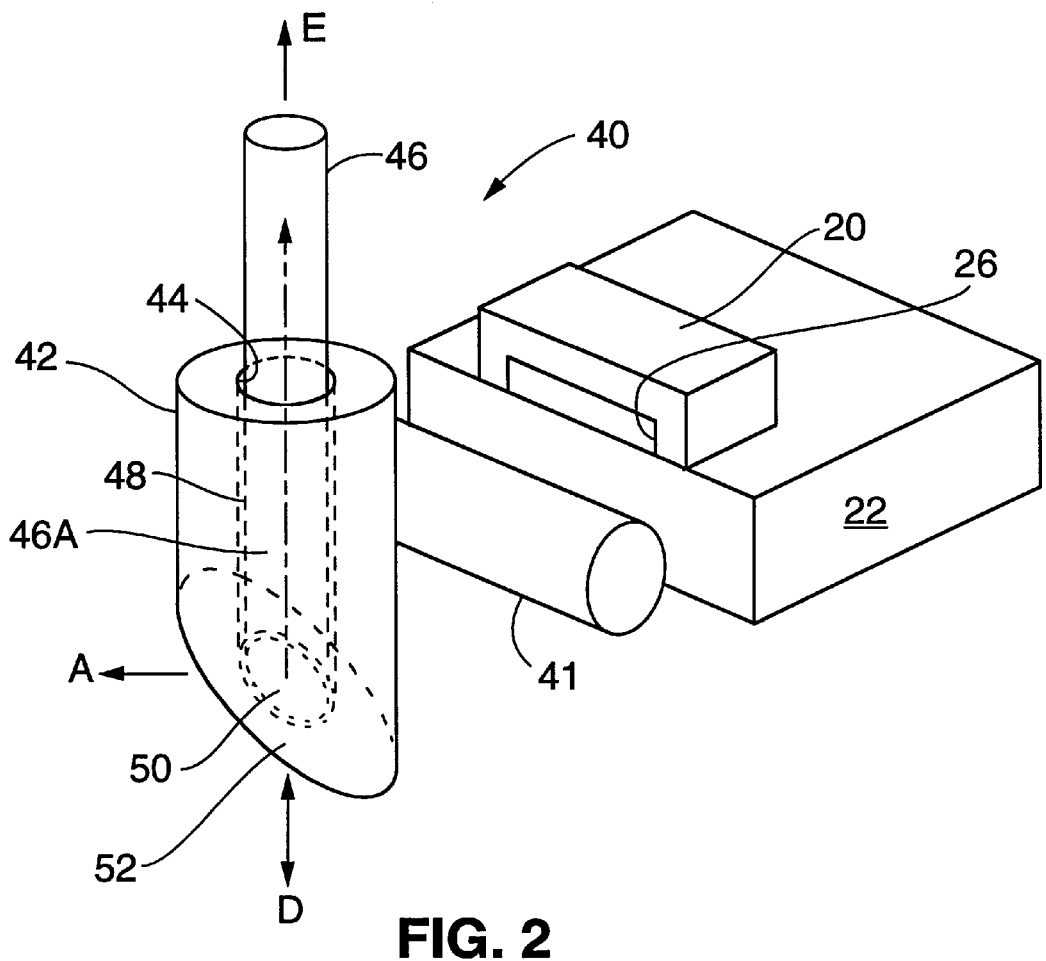
FIG. 2 is a perspective view schematically illustrating a preferred embodiment of a diode-laser to optical fiber coupling system in accordance with the present invention.
Figure 3:
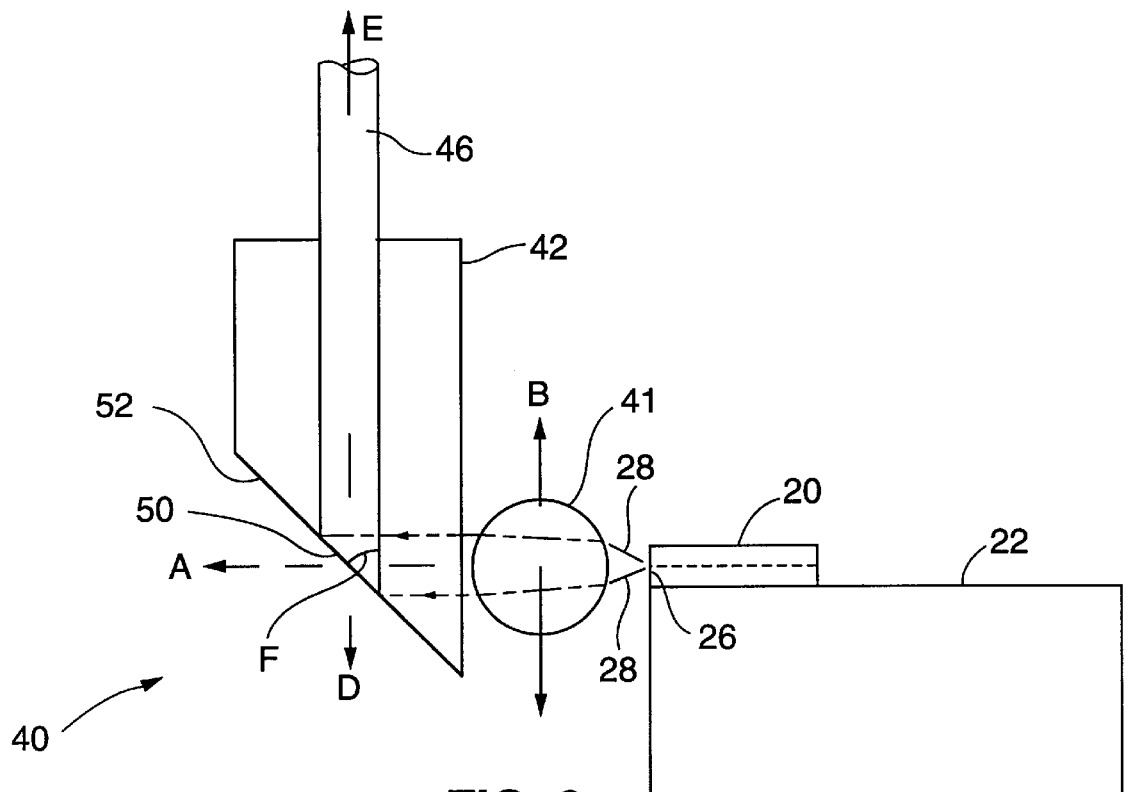
FIG. 3 is a side cross-sectional view of the diode-laser to optical fiber coupling system of FIG. 2.
Figure 4:
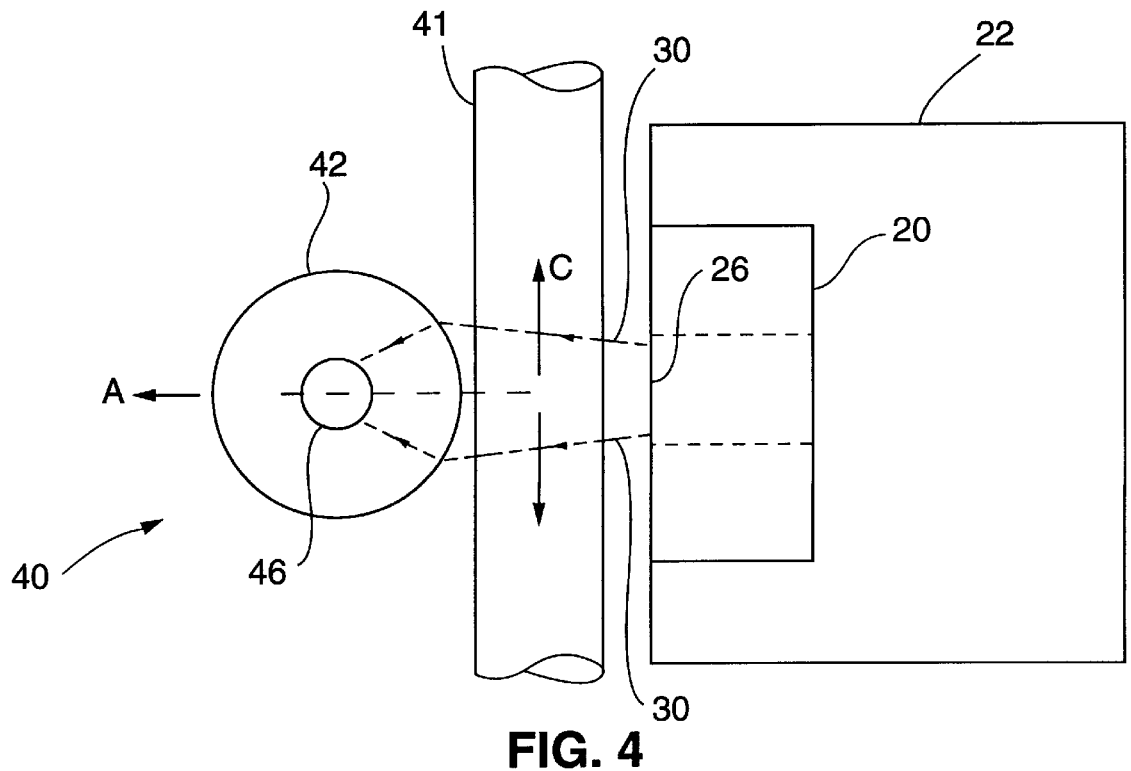
FIG. 4 is a top cross-sectional view of the diode-laser to optical fiber coupling system of FIG. 2.

Referring now to FIGS. 2, 3 and 4, in a preferred embodiment 40 of a diode-laser coupling system in accordance with the present invention, a cylindrical microlens 41, which may be conveniently, but not necessarily, a length of optical fiber, is located proximate emitting-area 26 of diode-laser 20 and parallel to slow axis C on propagation axis A. This microlens 41 could be anti-reflection coated to minimize transmission losses. On a side of microlens 41 opposite emitting-area 26 is located another microlens 42 which is in the form of a transparent tube having a capillary bore 44 therein which is on the cylindrical axis D of microlens 42. This transparent tube could be anti-reflection coated on its external surface to minimize transmission losses, which is much easier than coating the optical fiber 46 itself due to the relatively small size of the microlens 42. Bore 44 is sufficiently wide to accommodate an optical fiber 46 therein. Longitudinal axis E of optical fiber 46 is coaxial with cylindrical axis D of microlens 42. A space 48 (shown only in FIG. 2) between optical fiber 46 and microlens 42 is preferably filled with a transparent epoxy or the like which provides optical continuity between optical fiber 46 and microlens 42. Alternatively, optical fiber 46 could be fused into microlens 42 with or without an intermediate frit filler. In either case the optical fiber and microlens are intimately bonded so that the optical fiber is retained in the microlens and a continuous optical path between the microlens 42 and optical fiber 46 is established so that there is no glass to air interface therebetween.

An input-end 46A of optical fiber 46 has an end surface 50 generated thereon at an oblique angle F (see FIG. 3) preferably between about forty and fifty degrees and more preferably at about forty-five degrees to longitudinal axis E of optical fiber 46. End surface 50 provides an internally reflecting surface in optical fiber 46. This surface preferably uses total internal reflection to launch light into the optical fiber 46, however, it may be advantageous to coat this surface with a metal or thin film dielectric reflector. Use of microlenses 41/42 facilitate efficient total internal reflection by reducing the angle of divergence of the light incident on end surface 50, such that most of the rays of the light beam are incident above the critical angle for total internal reflection.

Coupling system 40 functions such that rays 28 in fast axis B of beam 24 are intercepted by microlens 41 and are collimated or focused by the microlens 41 and directed onto end surface 50 of optical fiber 46 via the other microlens 42. Microlens 42 has no optical power in fast axis B, so rays 28 are essentially not further refracted by passage through microlens 42.

Microlens 41 has no optical power in slow axis C. Accordingly, the divergence of slow-axis rays 30 is unchanged by passage through microlens 41. Rays 30, after passage through microlens 41 are intercepted by microlens 42 which has a radius of curvature (diameter) selected to collimate or focus rays 30 onto end surface 50. Rays 28 and 30 incident on end surface 50 are reflected from the surface and propagate in the usual manner generally longitudinally along the optical fiber.

It should be noted here that while microlenses 41 and 42 are depicted in FIGS. 2, 3, and 4 as circular in cross-section, these microlenses can have a non-circular cross-section (i.e. cylindrically aspheric) should this offer some advantage in optical design. It should also be noted that while optical fiber 46 is depicted as being coaxially immersed in microlens 42, fiber 46 may be eccentrically (paraxially) immersed in microlens 42, should this offer some advantage in optical design. From the description presented herein, merits or demerits of such optical design options will be evident to those skilled in the optical design art. Microlenses 41/42 can be inexpensively fabricated by drawing glass preforms.

Figure 5A:
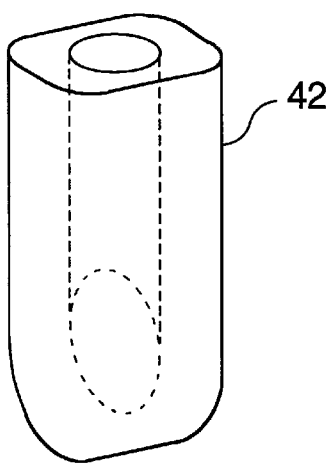
FIG. 5A is a perspective view of an alternate embodiment of the microlens mounted on the input surface of the optical fiber.

It is also possible to make selected surface portions of microlens 42, through which rays 28 and 30 do not pass, flat, as illustrated in FIG. 5A, for mounting the microlens or for stacking two or more such microlenses in an array.

Figure 5B:
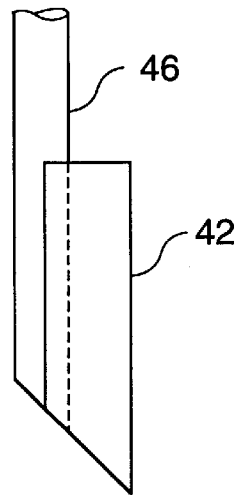
FIG. 5B a side view of a second alternate embodiment of the microlens mounted on the input surface of the optical fiber.
Figure 5C:
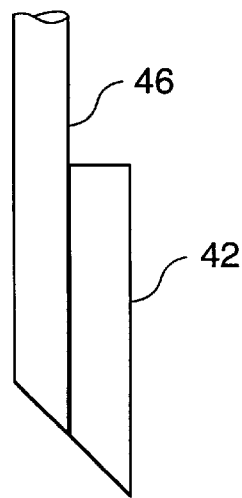
FIG. 5C is a side view of a third alternate embodiment of the microlens mounted on the input surface of the optical fiber.

Alternatively, the microlens 42 does not necessary need to encircle optical fiber 46, but instead could have a semi-cylindrical form with just a front portion mounted adjacent to and permanently bonded with optical fiber 46, as shown in FIG. 5B. Further, microlens 42 could instead be positioned along and affixed to optical fiber 46, as illustrated in FIG. 5C.

Figure 6:
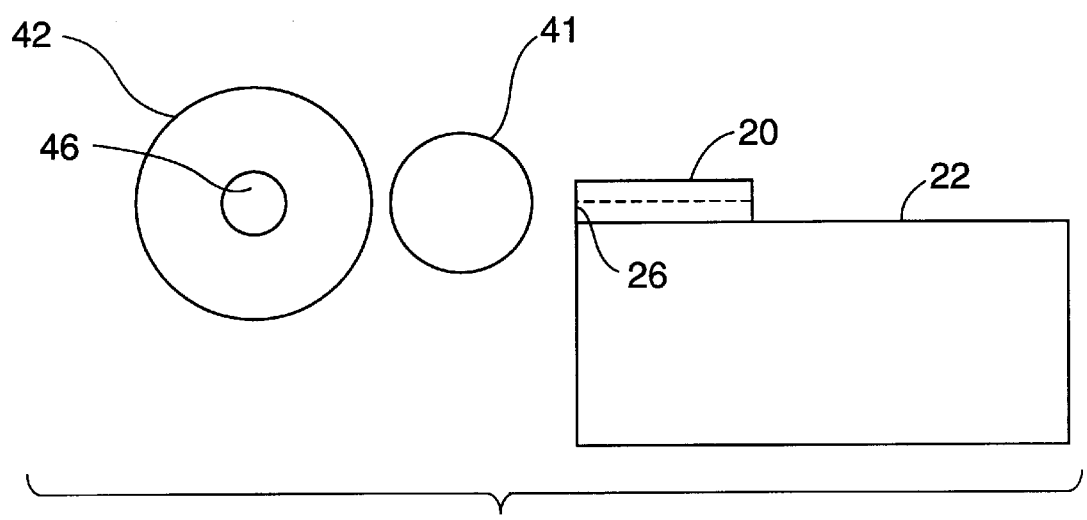
FIG. 6 is a side cross-sectional view of an alternate orientation of the microlenses of the present invention.

While optimal coupling is achieved by using the configuration described above where the optical fiber 46 and the microlens 41 are perpendicular to each other, it may be advantageous to align optical fiber 46 (with microlens 42) and microlens 41 in a parallel configuration, as shown in FIG. 6. This system is advantageous because the microlenses 41/42 both have optical powers on the fast-axis, which allows control over both the beam lateral dimension and beam divergence in this axis.

Figure 7A:
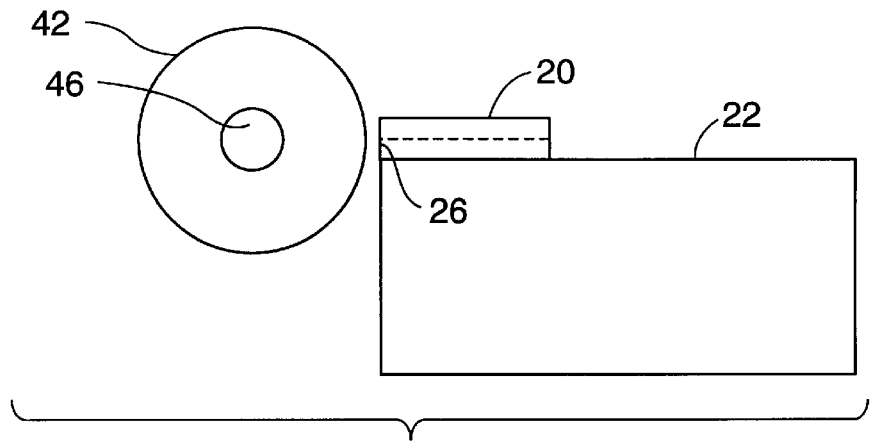
FIG. 7A is a side cross-sectional view of a diode-laser to optical fiber coupling system with only a single microlens.
Figure 7B:
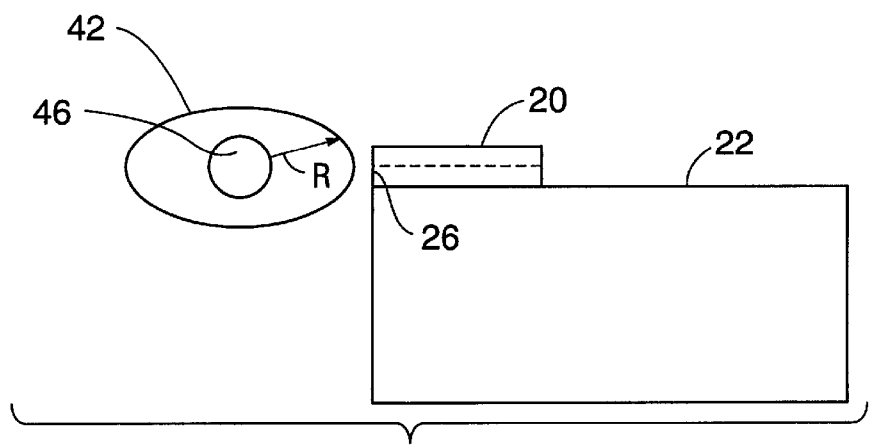
FIG. 7B is a wide cross-sectional view of the diode-laser to optical fiber coupling system of FIG. 7A where the single microlens has a shaped outer surface.

For a very low cost system, the microlens 41 could be eliminated and only the optical fiber 46 and its associated microlens 42 could be used to collect the laser diode light. This system is shown in FIG. 7A and would have the advantage of having only a single focusing element in the optical system. In this case the optical fiber 46 would be aligned with its longitudinal axis perpendicular to the fast axis of the laser diode so that the system optical power operates on this axis. The coupling efficiency can be enhanced by using a material to form microlens 42 that has a higher refractive index than the material used to form the fiber 46. Alternately, or in addition to using the higher refractive index material for microlens 46, the coupling efficiency can be (further) enhanced by shaping the outer surface of microlens 42 (through which light enters) as shown in FIG. 7B. The shaped outer surface, where the radius R thereof varies circumferentially, can optimally focus light incident thereon onto the reflecting surface 50 of fiber 46.

Figure 8:
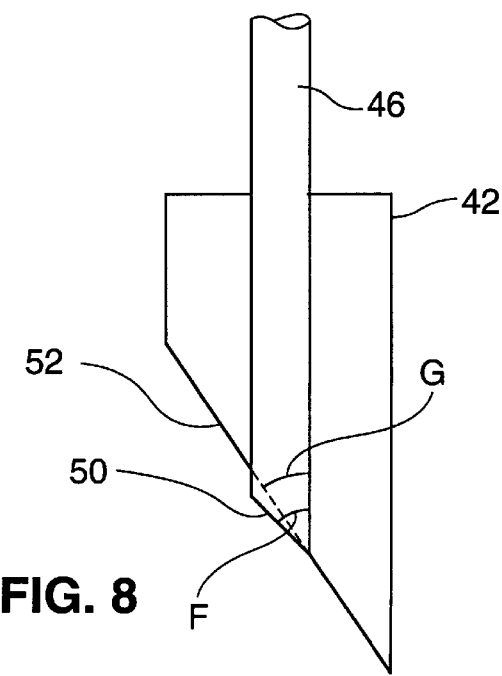
FIG. 8 is a side cross-sectional view of an alternate embodiment of the present invention.

In FIGS. 2 and 3, the end surface 52 of microlens 42 is shown to be formed with the same oblique angle F as end surface 50 of fiber 46. However, the end surface 52 of microlens 42 need not be fabricated at angle F, since only light striking the fiber end surface 50 is coupled into optical fiber 46. In fact, there are several advantages to having end surfaces 50 and 52 be formed with different oblique angles. For example, if glue is used to affix optical fiber 46 into microlens 42, the glue can shrink while it dries, thus creating voids between fiber 46 and microlens 42 that reduces the quality of optical continuity therebetween. Further, wicking of glue onto fiber end surface 50 can be a problem. A solution is to form end surface 52 with an oblique angle G that is different from the oblique angle F of fiber end surface 50, as shown in FIG. 8. With this configuration, the fiber 46 is allowed to move relative to microlens 42 while the glue dries, thus preventing the occurrence of voids therebetween. Further, wicking is prevented because the end surfaces 50/52 are not co-planar.

It should be noted that while the present invention has been described in terms of coupling light from a single diode laser into a single fiber, those skilled in the art will recognize, without further description, that principles of the present invention are similarly applicable to coupling light from an array of diode-lasers (e.g. in a diode laser bar) into a corresponding array of optical fibers.

What is claimed is:

1. A coupling system for enhancing the coupling of light between a laser diode and an optical fiber, comprising:

a laser diode having an emitting surface for generating an asymmetric beam;

an optical fiber having an input end and a delivery end with the input end including:
a beveled end surface disposed at an oblique angle with respect to a longitudinal axis of the optical fiber, and
a light input side surface opposing the beveled end surface and aligned with the emitting surface of the laser diode to capture the beam emitted therefrom, wherein the angle of the beveled surface is selected such that the beam entering the input side surface from the laser diode is reflected by the beveled surface along the longitudinal axis of the fiber; and
a first microlens mounted on the input side surface of the fiber in a manner to have optical continuity therewith for focusing light into the fiber.

2. The coupling system as recited in claim 1, wherein the first microlens has a focal power along an axis perpendicular to the longitudinal axis of the fiber.

3. The coupling system as recited in claim 2, further comprising:
a second microlens disposed between the laser diode and the first microlens, wherein the asymmetric beam has a fast axis that is more divergent than a slow axis and the second microlens has a focal power along the fast axis of the beam.

4. The coupling system as recited in claim 3, wherein the second microlens is a cylindrical lens with a longitudinal axis thereof oriented parallel to the slow axis of the beam.

5. The coupling system as recited in claim 4, wherein the longitudinal axis of the fiber is oriented substantially parallel to the longitudinal axis of the second microlens.

6. The coupling system as recited in claim 2, wherein the first microlens is a capillary tube that is coaxially disposed around the input end of the optical fiber.

7. The coupling system as recited in claim 2, wherein the first microlens is paraxially disposed around the input end of the optical fiber.

8. The coupling system as recited in claim 2, wherein the oblique angle of the beveled surface is selected such that the beam entering the input side surface from the laser diode is incident on the beveled surface above the critical angle thereof for total internal reflection.

9. The coupling system as recited in claim 2, wherein the first microlens has a beveled end surface that is adjacent to the beveled end surface of the optical fiber and is disposed at an oblique angle with respect to the longitudinal axis of the optical fiber that is different from the oblique angle of the optical fiber end surface.

10. The coupling system as recited in claim 2, wherein the optical fiber input side surface is formed of a first material having a first refractive index, and the first microlens is made of a second material having a second refractive index that is greater than the first refractive index.

11. The coupling system as recited in claim 2, wherein the first microlens has a shaped outer surface that has a non-circular cross-section.

12. A coupling system for enhancing the coupling of light between a laser diode and an optical fiber, comprising:
a laser diode having an emitting surface for generating an asymmetric beam with a fast axis that is more divergent than an orthogonal slow axis thereof;
an optical fiber having an input end and a delivery end with the input end including:
a beveled end surface disposed at an oblique angle with respect to a longitudinal axis of the optical fiber, and
a light input side surface opposing the beveled end surface and aligned with the emitting surface of the laser diode to capture the beam emitted therefrom, wherein the angle of the beveled surface is selected such that the beam entering the input side surface from the laser diode is total internally reflected by the beveled surface along the longitudinal axis of the fiber;
a first microlens mounted on the input side surface of the fiber in a manner to have optical continuity therewith for focusing light into the fiber and having a focal power along an axis perpendicular to the longitudinal axis of the fiber; and
a second microlens disposed between the laser diode and the first microlens and having a focal power along the fast axis of the beam.

13. The coupling system as recited in claim 12, wherein the second microlens is a cylindrical lens with a longitudinal axis thereof oriented parallel to the slow axis of the beam.

14. The coupling system as recited in claim 12, wherein the first microlens has an anti-reflection coating on an input surface thereof through which the beam enters the first microlens.

15. The coupling system as recited in claim 12, wherein the first microlens is a capillary tube that is coaxially disposed around the input end of the optical fiber.

16. The coupling system as recited in claim 12, wherein the first microlens is paraxially disposed around the input end of the optical fiber.

17. A system for enhancing the coupling of light between a laser diode and an optical fiber comprising:
a laser diode having an emitting surface;
an optical fiber having an input end and a delivery end with the input end of the optical fiber including a beveled surface disposed at a non-normal angle with respect to the longitudinal axis of the optical fiber and opposed to a light input surface of the fiber and wherein the angle of the beveled surface is selected such that light entering the input surface of the fiber will be totally internally reflected into the fiber and with the input surface of the fiber being aligned with the emitting surface of the laser diode; and
a microlens mounted on the input surface of the fiber for focusing light into the fiber.

18. The system as recited in claim 17 wherein the microlens has a focal power along an axis perpendicular to the longitudinal axis of the fiber.

19. A system for enhancing the coupling of light between a laser diode and an optical fiber comprising:
a laser diode having an emitting surface and generating an asymmetric beam having a fast axis and a slow axis;
an optical fiber having an input end and a delivery end with the input end of the optical fiber including a beveled surface disposed at a non-normal angle with respect to the longitudinal axis of the optical fiber and opposed to a light input surface of the fiber and wherein the angle of the beveled surface is selected such that light entering the input surface of the fiber will be totally internally reflected into the fiber and with the longitudinal axis of the input surface of the fiber being aligned with the fast axis of the emitting surface of the laser diode;
a first microlens mounted on the input surface of the fiber for focusing light into the fiber and having a focal power along the slow axis of the emitting surface of the laser diode, and
a second microlens located between the laser diode and the fiber for focusing light into the fiber and having a focal power in the fast axis of the emitting surface of the laser diode.

* * * * *